(12) United States Patent
Whipkey

(10) Patent No.: US 12,385,584 B2
(45) Date of Patent: Aug. 12, 2025

(54) PIPELINE FITTING

(71) Applicant: COOPER-STANDARD AUTOMOTIVE INC, Northville, MI (US)

(72) Inventor: Jesse Richard Whipkey, Oscoda, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 18/142,765

(22) Filed: May 3, 2023

(65) Prior Publication Data

US 2024/0369165 A1    Nov. 7, 2024

(51) Int. Cl.
*F16L 41/03*    (2006.01)
*F16L 33/30*    (2006.01)
*F16L 41/02*    (2006.01)

(52) U.S. Cl.
CPC .............. *F16L 33/30* (2013.01); *F16L 41/021* (2013.01); *F16L 41/03* (2013.01)

(58) Field of Classification Search
CPC ......... F16L 33/30; F16L 33/006; F16L 47/06; F16L 47/005; F16L 47/00
See application file for complete search history.

(56) References Cited

U.S. PATENT DOCUMENTS

| | | | | |
|---|---|---|---|---|
| 585,014 A * | 6/1897 | Wenzel et al. | .......... | F16L 33/30 285/251 |
| 928,237 A * | 7/1909 | Baird | ...................... | F16L 33/30 285/251 |
| 1,996,855 A * | 4/1935 | Cheswright | ............. | F16L 33/30 285/259 |
| 2,139,745 A | 12/1938 | Goodall | | |
| 3,767,233 A * | 10/1973 | Hodge | ..................... | F16L 33/30 285/239 |
| 4,875,719 A * | 10/1989 | Mylett | ..................... | F16L 31/00 285/259 |
| 5,076,615 A * | 12/1991 | Sampson | ................ | F16L 33/00 285/259 |
| 11,149,887 B2 | 10/2021 | Morris et al. | | |
| 2002/0167166 A1* | 11/2002 | Klein | ...................... | F16L 33/30 285/259 |

(Continued)

FOREIGN PATENT DOCUMENTS

JP    2018119663 A    8/2018

*Primary Examiner* — Zachary T Dragicevich
*Assistant Examiner* — James A Linford
(74) *Attorney, Agent, or Firm* — Paschall & Associates, LLC; Anthony Miologos; James C. Paschall

(57) ABSTRACT

A pipeline fitting comprises a body having a first tubular nose section formed on a first end portion of the pipeline fitting. At least one gripping member having a ramped wall extends axially over the body from the first nose section, the gripping member terminating in a lengthened radial gripping surface located between first and second shortened radial gripping surfaces that are positioned perpendicularly on the body to the axial direction of the gripping member ramped wall. The gripping member is configured to be received at least partly within the end portion of a tube when the gripping member is received at least partly within the end portion of the tube to frictionally engage an inner surface of the end portion of the tube to the gripping member.

19 Claims, 3 Drawing Sheets

(56) References Cited

U.S. PATENT DOCUMENTS

| | | | |
|---|---|---|---|
| 2007/0278789 A1* | 12/2007 | Thacker | F16L 33/22 |
| | | | 285/239 |
| 2010/0244438 A1* | 9/2010 | Johanson | F16L 33/24 |
| | | | 285/148.21 |
| 2012/0248759 A1* | 10/2012 | Feith | B25B 27/10 |
| | | | 137/15.01 |
| 2014/0091532 A1 | 4/2014 | Unger et al. | |

* cited by examiner

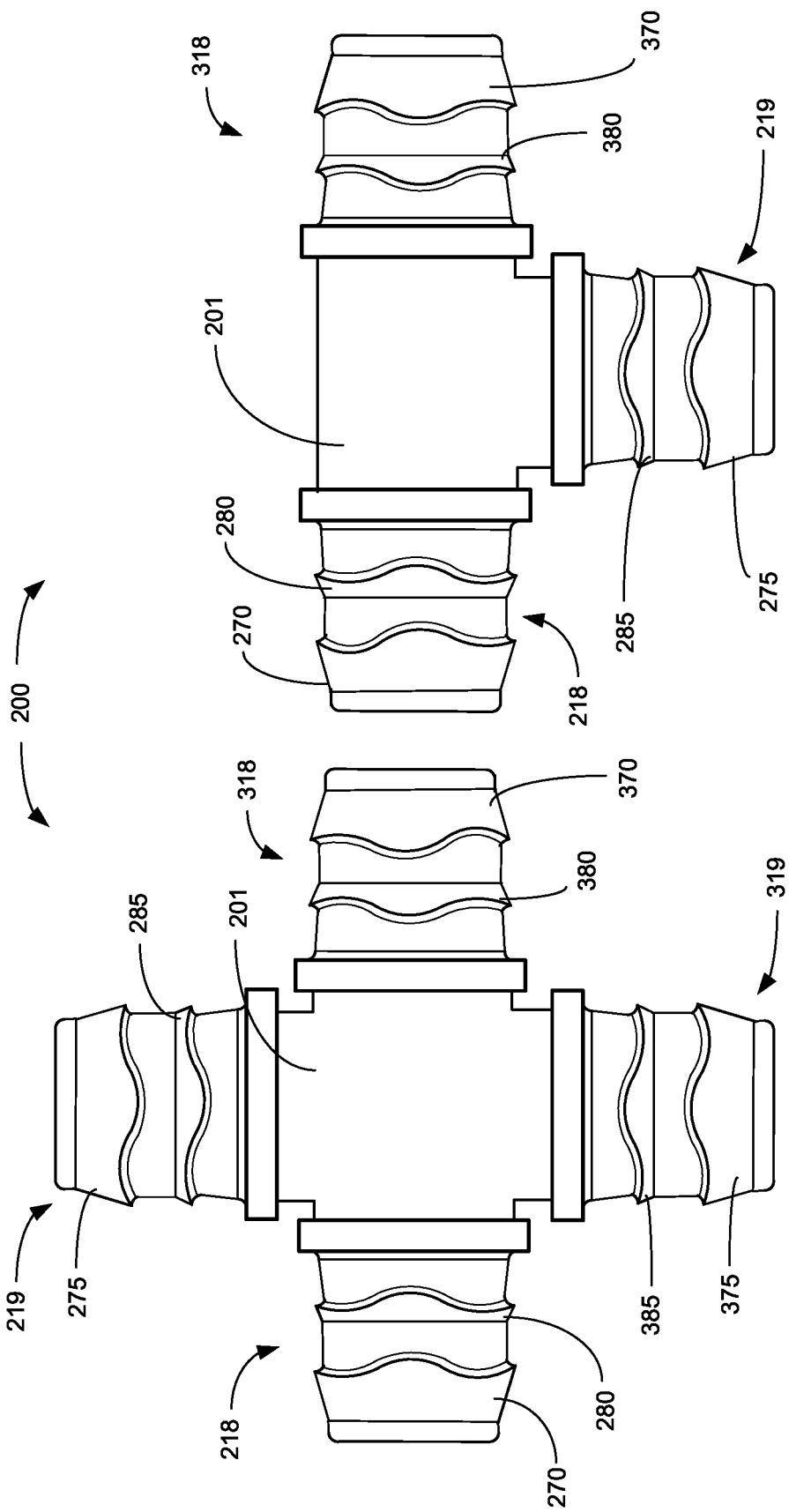

PIPELINE FITTING

TECHNICAL FIELD

This disclosure is generally directed to a pipeline fitting adapted to have a flexible polymeric tube installed on the fitting. More specifically, it relates to a pipeline fitting having an end form that provides and maintains a fluid coupling between the end form and a flexible polymeric tube.

BACKGROUND

An end form is typically formed on opposing end portions of a metal or plastic pipeline fitting to connect flexible polymeric tubes to the fitting. Each end form of the pipeline fitting is shaped to accept a flexible tube onto a respective end form in order to join a respective tube to the pipeline fitting. This tube joining construction is suitable for piping that transports fluids, such as gasoline, oil, water, and air, from a fluid source side, such as a vessel or storage tank, to a fluid receiving side, such as motor vehicles and various machines an engines carburetor or other fuel metering system. A fluid tight seal is maintained between the tubes and the pipeline fitting only by the tightness of the polymeric hose against the end forms. In order to prevent creep deformation of the tube due to heat deterioration and/or other environmental or chemical factors that may cause leaking, the shape of the end form is typically designed to provide a firm rigid fit against the tube in order to maintain a tight seal. However, a firm fit makes the installation of the tube onto the fitting by hand difficult and typically requires the use of specialized powered tools or other mechanical devices to provide sufficient force to mount the tube on the end form.

Therefore, it is the object of the present disclosure to provide an end form for a pipeline fitting that provides and maintains a fluid tight fit between the fitting end form and a flexible polymeric tube, and which can be easily installed in the tube with or without hand tools.

SUMMARY

This disclosure relates to a relates to an end form for a pipeline fitting that provides a fluid tight fit between the end form and a flexible polymeric tube and that can be installed with or without the use of tools.

In a first embodiment a pipeline fitting is disclosed. The pipeline fitting comprises a body having a tubular nose section, and a first end form formed on a first end portion of the pipeline fitting. At least one gripping member having a ramped wall extends axially over the body. The gripping member terminates in a lengthened radial gripping surface located between the first and second shortened gripping surfaces that are positioned perpendicularly on the body to the axial direction of the gripping member ramped wall.

In a second embodiment a pipeline fitting connectable to an end portion of a first tube is disclosed. The pipeline fitting comprises a body having a first tubular nose section and a first end form formed on a first end portion of the pipeline fitting. At least one gripping member having a ramped wall extends axially over the body from the first nose section, the gripping member terminating in a lengthened radial gripping surface located between first and second shortened radial gripping surfaces that are positioned perpendicularly on the body to the axial direction of the gripping member ramped wall. The gripping member is configured to be received at least partly within the end portion of the first tube when the gripping member is received at least partly within the end portion of the first tube to frictionally engage an inner surface of the end portion of the first tube to the gripping member.

In a third embodiment a pipeline fitting for coupling a plurality of tubes is disclosed. The pipeline fitting comprises a body having an internal passage and a first end portion and at least one other end portion located on the body. An end form is fashioned on the first end portion between a tubular nose section having an opening to the internal passage. At least one other end form is fashioned on the at least one other end portion between another nose section having an opening to the internal passage. At least one gripping member is formed on the end form having a ramped wall extending axially over the body from the nose section with the gripping member terminating in a lengthened radial gripping surface located between first and second shortened radial gripping surfaces that are positioned perpendicularly on the body to the axial direction of the gripping member ramped wall. At least one other gripping member is formed on the other end form having a ramped wall extending axially over the body from the other end form nose section with the at least one other gripping member terminating in a lengthened radial gripping surface located between first and second shortened radial gripping surfaces that are positioned perpendicularly on the body to the axial direction of the other gripping member ramped wall. The gripping member is configured to be received at least partly within an end portion of at least one of the plurality of tubes when the nose section and gripping member are received at least partly within the end portion of the one tube to frictionally engage an inner surface of the end portion of the one tube to the gripping member and couple the nose section and the interior passage to the one tube. The other gripping member configured to be received at least partly within an end portion of another tube of the plurality of tubes when the other nose section and other gripping member are received at least partly within the end portion of the another tube to frictionally engage an inner surface of the end portion of the another tube to the other gripping member and the other nose section and couple the other nose section and the interior passage to the another tube.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 3 is aside elevational view of an example pipeline fitting for coupling three tubes in accordance with the present disclosure; and FIG. 4 is aside elevational view of an example pipeline fitting for coupling four tubes in accordance with the present disclosure.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
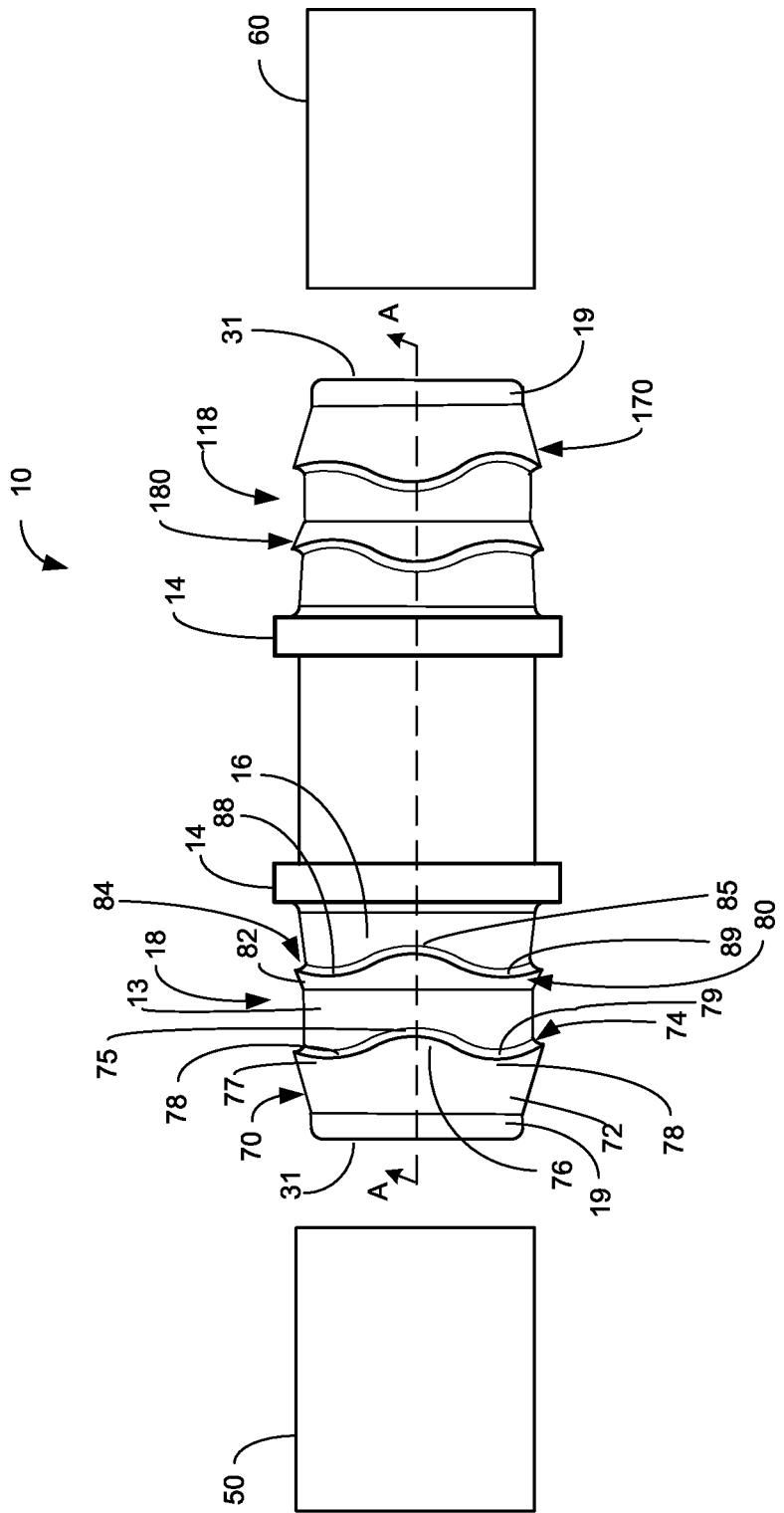
FIG. 1 is aside elevational view of an example pipeline fitting for coupling two tubes in accordance with the present disclosure.
Figure 2:
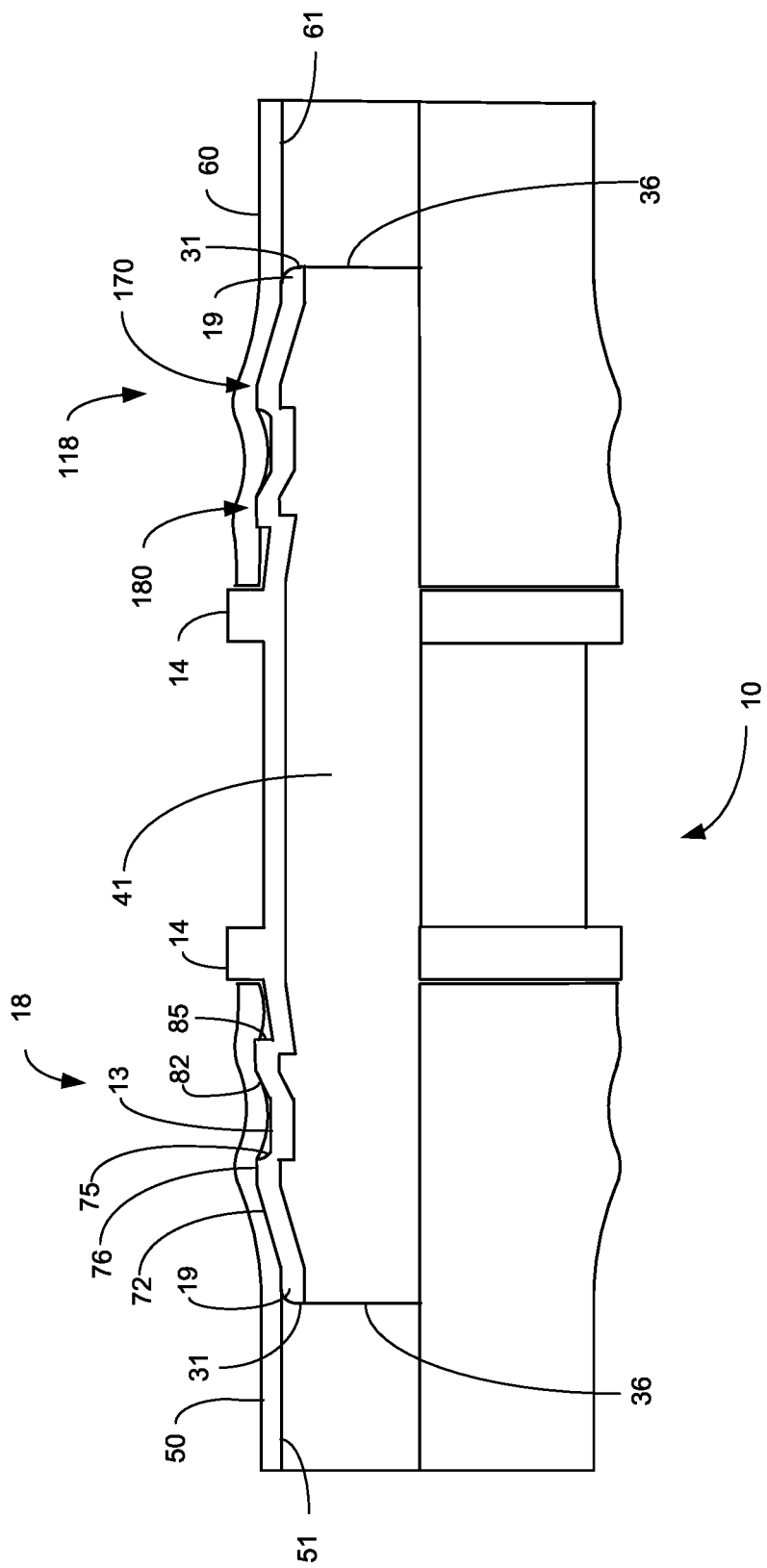
FIG. 2 is a side elevational view of an example pipeline fitting showing an upper-half sectional view of the pipeline fitting of FIG. 1 in accordance with the present disclosure.

With reference to the drawings, FIGS. 1-2 illustrate an example embodiment of a pipeline fitting 10 connectable to the end portions of flexible polymeric tubes 50, 60. The illustrated pipeline fitting 10 can be used to connect two similarly sized tubes to the fitting 10. An end form is formed on an end portion of the fitting 10 configured to be received least partly within an end portion of each polymeric tube 50, 60. The end forms of fitting 10 engage an inner surface 51, 61 of the end portion of each of the polymeric tubes 50, 60 to help frictionally secure the end portion of each tube 50, 60 on the fitting 10 when the end form is received at least partly within the end portion of each tube 50, 60. The inner surface 51, 61 of the end portion of each tube 50, 60 applying pressure onto a respective end form.

In another embodiment an end form may be formed on the end of a rigid tube, such as a metal tube typically used between a vehicle's fuel tank and an engine carburetor, or other fuel metering system. The end form formed on the end of the rigid tube is arranged to be received partially within an end portion of a flexible tube that fluidically connects the rigid tube to a vehicle's carburetor. In still another embodiment, an end form may be formed on the coupling end of a connector body allowing a flexible tube to be fitted on the connector body to form a fluid coupling between the connector body and the tube.

As shown in FIG. 1, the illustrated pipeline fitting 10 generally includes first and second generally tubular-shaped end forms 18 and 118 and first and second frustoconically-shaped gripping members 70 and 80 on end form 118 and first and second frustoconically-shaped gripping members 170, 180 on end form 118. The end forms 18, 118, and the gripping members 70, 80 and 170, 180 are each configured (e.g., sized, shaped, constructed, etc.) for use in connecting the fitting 10 to the two individual flexible polymeric tubes 50, 60, to thereby interconnect the two individual tubes. The illustrated fitting 10 is formed such that the first and second end forms 18 and 118 are an integral, or monolithic, structure. However, the first and second end forms 18 and 118 may be formed separately and coupled together to form the pipeline fitting 10 within the scope of the present disclosure. The first and second end forms 18 and 118, and the first and second gripping members 70, 170 and 80, 180 are configured (e.g., sized, shaped, constructed, etc.) to cooperatively receive end portions of tubes 50, 60 over the respective end forms 18 and 118 and onto the first and second gripping members 70, 170, and 80, 180 of a respective end form 18, 118. Together, the end forms 18 and 118, and their respective first 70, 170 and second 80, 180 gripping members cooperate to retain the fitting 10 on the polymeric tubes 50, 60 by frictionally engaging the tubes.

With additional reference to FIG. 2, which is shown in partial section along line A-A of FIG. 1, an interior passage 41 or channel is centrally defined generally through the first and second end forms 18 and 118 for allowing fluid to flow through the interior passage 41 and through the fitting 10. The illustrated interior passage 41 extends completely through the fitting 10 to thereby allow the fluid to flow through the fitting 10 and between tubes 50, 60 interconnected by the fitting.

The first end form 18, and the first and second gripping members 70 and 80 of the illustrated fitting 10 will be described next, with it understood that a description of the second end form 118, and the first and second gripping members 170, 180 of the illustrated pipeline fitting 10 being substantially the same.

With reference to both FIGS. 1-2, the first end form 18 of the example pipeline fitting 10 generally includes a tubular nose section 19 having a front face 31 that includes a centrally located opening 36 extending through the front face 31 to the interior passage 41, a flange 14, and a body 13 disposed generally between the front face 31 and the flange 14. The nose section 19 of the illustrated first end form 18 is configured (e.g., tapered, rounded, etc. in shape) for facilitating movement of the end form 18 into an end portion of the tube 50 when the fitting 10 is to be coupled to the tube 50, such that the first end form 18 can be received at least partly within the end portion of the tube 50. The first end form's nose section 19 may be shaped differently than illustrated and/or described herein for facilitating movement of the end form into the end portion of the tube within the scope of the disclosure. For example, the end form may include a step-shaped nose section, a squared-off open end portion, etc. within the scope of the disclosure.

The first gripping member 70 is generally frustoconically-shaped and includes an outwardly extending circumferential ramped wall 72 that extends axially from the tubular nose section 19 to a multi-radial circumferential first step 74. The first step 74 terminating on the surface of body 13. The first gripping member 70 is configured to include at least one axially lengthened radial gripping surface 76 extending along the wall 72 and terminating in an outwardly radial first step segment 75 of the first step 74. The extended gripping surface 76 is located between a pair of shortened gripping surfaces 77 and 78 that extend inwardly toward the nose section 19 and that terminate at the first step 74 at respective complementary radial segments 78, 79. As is best seem in FIG. 1, the first gripping member 70 forms a "wavy" surface feature that extends perpendicularly to the axis of the fitting 10 that is comprised of a lengthened gripping surface 76 having an extended surface area located between a pair of shorter gripping surfaces 77 and 78, the shorter gripping surfaces 77 and 78 having reduced surface areas. In the example of FIG. 1, the first gripping member 70 is shown formed on a side of end portion 18. The gripping member 70 in this example, may also be formed in the same manner on an opposing side of end form 18.

The second gripping member 80 is generally frustoconically-shaped and also includes an outwardly extending circumferentially ramped wall 82 that extends axially from body 13 to a multi-radial circumferential second step 84. The second step 84 terminating on surface 16 of body 13. The ramped wall 82 of the second gripping member 80 in the example of FIG. 1 is illustrated having a ramped wall height above body 13 that is the same or equal to the height attained by the ramped wall 72 of the first gripping member 70. However, it will be understood that each gripping member 70 and 80 may also have differing ramped wall heights that are not equal. The second gripping member 80 is configured to include at least one axially lengthened gripping surface, in axial alignment to the first gripping member 70 surface 76. The extended gripping surface of the second gripping member 80 extending along the ramped wall 82 and terminating in an outwardly radial segment 85 of the second step 84. The extended gripping surface of the second gripping member 84 is located between a pair of shortened gripping surfaces that extend inwardly toward the multi-radial first step 74 of the first gripping member 70 and which are in alignment with the shortened gripping surfaces 77 and 78 of the first gripping member 70. The shortened gripping surfaces of the second gripping member 80 terminate at respective complementary radial second step segments 88 and 89. The second gripping member 80, similarly to the first gripping member 70, forms a "wavy" surface feature that extends perpendicularly to the axis of the fitting 10, comprised of a lengthened gripping surface having an extended surface area located between a pair of shorter gripping surfaces having reduced surface areas. In the example of FIG. 1, the second gripping member 80 is shown formed on a side of end form 18. The gripping member 80 in this example, may also be formed in the same manner on an opposing side of end form 18.

An example process for connecting the pipeline fitting 10 to an end portion of a tube will now be described. The process will be described with reference again to the first end form 18, the nose section 19, and the first and the second gripping members 70, 80 with it understood that the process would be substantially the same for connecting the fitting 10 to tube 60 at the second end form 118.

When desired to connect the fitting 10 to an end portion of the tube 50, the end portion of the tube 50 is slid over the nose section 19 of the first end form 18 via a positive force or pressure, thereby moving the tube 50 axially over the end form 18. As the end portion of the tube 50 continues to move over the first gripping member 70, it engages the ramped wall 72. At this point, the inner surface 51 of the tube 50 slides along the ramped wall 72 expanding the tube 50 to a diameter larger than it had in a relaxed condition. The inner surface 51 of the tube 50 is expanded to the height of the wall 72 of the first gripping member 70.

As tube 50 continues to be urged axially onto the end form 18, the tube end portion relaxes and attempts to retain its relaxed state and collapses towards body 13 and over the multi-radial first step 74. As the tube is continued to be urged axially over the end form 18, it engages the ramped surface 82 of the second gripping member 80. The inner surface 51 of the tube 50 slides along the ramped surface 82 expanding the tube 50 again to an inner diameter greater than it had in its relaxed condition. The inner surface 51 of the tube 50 is expanded to the height of the wall 82 as it did for the first gripping member 70.

The end portion of tube 50 may continue to move over the first and second gripping members 70 and 80 until it is adjacent to the flange 14. In this position, the end portion of the tube 50 may also engage or abut the flange 14 such that further movement of the end portion of the tube over the first end form 18 is resisted by the flange 14. The fitting 10 is now connected to the end portion of the tube 50. The wavy form of the gripping member 70, 80 contributes to reduced insertion forces required to axially force the tube 50 on the gripping members 70, 80 and an increase in resistance to longitudinal or rotational forces that may be applied to the tube.

The flexible polymeric tubes 50 and 60 may be made of polyamide resin, fluoroplastics, olefin resin, and so on, and each have an inside diameter that is less than the outside diameter of body 13 of the pipeline fitting 10. Therefore, when the tubes 50, 60 are installed on the end forms 18, 118 each of the tubes 50, 60 make a tight liquid-proof contact and seal with its respective end form 18, 118. With tube 50 installed on end form 18 of fitting 10, a fluid coupling is made between the tube 50 that provides access into the central passage 41 through opening 36. With the tube 60 installed in a like manner as explained above for tube 50, a fluid coupling can be made between the pipeline end form 118 and opening 36 to passage 41 and tube 50.

Any convenient manufacturing process may be used to form the first and second gripping members of each end form and the flanges on a cylindrical body, or other rigid pipe body. The structures formed on the pipeline fitting 10 may be formed as a single unitary structure from a suitable metal material or a rigid polymer material.

It will be appreciated that the fitting disclosed herein may include first gripping members 70, 170 and second gripping members 80, 180 that extend completely around the end forms of the pipeline fitting 10, or may include first and second gripping members 70, 170 and 80, 180 that extend only partly around the end forms 18, 118 that are within the scope of the present disclosure. Further, the pipeline fitting 10 and its surface features disclosed herein may include such materials as nylon, styrene, acrylonitrile butadiene styrene (ABS). Or may be composed of any suitable metal or metallic material.

An example of a further embodiment of the present disclosure is illustrated in FIGS. 3 and 4. A pipeline fitting 200 may be configured to include three or more end forms arranged to be fitted to three or more tubes in the manner explained above for FIGS. 1 and 2.

An example pipeline fitting 200 is shown in FIG. 3. The example fitting 200 includes first, second and third tubular-shaped end forms 218, 318 and 219 extending from respective end portions of a fitting body 201 in a T-shaped configuration. First and second frustoconically-shaped gripping members 270 and 280 are formed on end form 218 and first and second frustoconically-shaped gripping members 370, 380 are formed on end form 318. Similarly, first and second gripping members 275, 285 are formed on end form 219.

A second example fitting 200 is illustrated by FIG. 4, that includes a fourth end form 319 extending from an end portion of the body 201, forming a cross-shaped configuration. End form 319, includes first and second frustoconically-shaped gripping members 375, 385.

Each end form 218, 318, 219 and 319 and their associated gripping members 270, 280, 370, 380 275, 285 and 375, 385, respectively, are configured (e.g., sized, shaped, constructed, etc.) for use in connecting the fitting 200 to individual flexible polymeric tubes. For example, for the fitting shown in FIG. 3, three individual tubes can be interconnected together with the end portions of each tube fitted on a respective end form 218, 318 and 219. Four individual tubes can be interconnected to the end forms 218, 318, 219 and 319 of fitting 200 illustrated by FIG. 4.

An interior passage or channel, similar to the interior passage 41 shown in FIG. 2, is centrally defined generally through the end forms 218, 318, 219 and 319 allowing fluid to flow through the interior passage and through the fitting 200. The interior passage extends completely through the fitting 200, to allow fluid to flow through the passage and between the tubes interconnected by the fitting 200.

As illustrated in the example fitting 200 shown in FIGS. 3 and 4, the fitting 200 is formed such that the end forms 218, 318, 219 and 319 are an integral, or monolithic, structure. However, the end forms may be formed separately and coupled together to form the pipeline fitting 200 within the scope of the present disclosure. The end forms 218, 318, 219 and 319 and their associated gripping members 270, 280, 370, 380, 275, 285 and 375, 385, respectively, are configured (e.g., sized, shaped, constructed, etc.) to cooperatively receive end portions of flexible polymeric tubes over each of the respective end forms and onto the gripping members of an end form. Together, the end forms and their respective first and second gripping members cooperate as explained above for the fitting 10 of FIG. 1, to retain the fitting 200 on a respective polymeric tube by frictionally engaging the tubes.

As was explained above for the fitting 10, the fitting 200 of FIGS. 3 and 4 may include first gripping members and second gripping members that extend completely around the end forms of the pipeline fitting 200 or may include first and second gripping members that extend only partly around the end forms that are within the scope of the present disclosure. Further, the pipeline fitting 200 and its surface features disclosed herein may include such materials as nylon, styrene, acrylonitrile butadiene styrene (ABS). Or may be composed of any suitable metal or metallic material.

Additionally, the embodiment illustrated by the T-shaped and cross-shaped forms of FIGS. 3 and 4, respectively are only examples illustrating that certain configurations of end forms may be constructed according to the present disclosure. Other configurations of the pipeline fitting 200 having configurations of multiple end forms such as for example, L-shaped, Y-shaped, X-shaped, or other connection configurations that interconnect a plurality of end portion of tubes may be made without departing from scope of the present disclosure.

Generally, dimensions of tubes are regulated by the inside diameter. However, wall thickness of tubes can vary such that two tubes with the same inside diameter may have a different outside diameter. It should also be appreciated that embodiments of the fitting of the present disclosure are capable of engaging inner surfaces of the tubes for help in retaining the pipeline fitting 10 on end portions of the tubes 50, 60. This may help better seal and/or secure the pipeline fitting 10 to the tubes 50, 60, as compared to fittings that connect to only the outer surfaces of tubes.

Specific dimensions, angular rotations, etc. included in the disclosure are examples in nature and do not limit the scope of the present disclosure.

This disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A pipeline fitting comprising:
   a body having a tubular nose section and a first end form formed on a first end portion of the pipeline fitting; and
   at least one gripping member having a ramped wall extending axially over the body to a first height from the nose section, the gripping member ramped wall forming a gripping surface having a lengthened radial gripping surface portion located between first and second shortened radial gripping surface portions that are positioned perpendicularly on the body in the axial direction of the gripping member ramped wall and that terminate at a multi-radial first step extending perpendicularly from the body that join the lengthened radial gripping surface portion and the first and second shortened radial gripping surface portions to the body; and
   at least one additional gripping member having a ramped wall that extends from the body at a location spaced axially from the first step and that extends axially over the body to the first height, the additional gripping member ramped wall forming a gripping surface.

2. The pipeline fitting of claim 1, wherein the at least one additional gripping member terminates in a lengthened radial gripping surface-portion located between first and second shortened radial gripping surface portions that are positioned perpendicularly on the body to the axial direction of the additional gripping member ramped wall.

3. The pipeline fitting of claim 2, wherein the additional gripping member further includes a multi-radial second step located perpendicularly on the body to the axial direction of the additional gripping member ramped wall and the additional gripping member lengthened radial gripping surface and the first and second shortened radial gripping surfaces terminate at the second step, whereby the second step joins the additional gripping member ramped wall to the body.

4. The pipeline fitting of claim 2, wherein the first end form includes a plurality of gripping members and first and second steps located about the first end form.

5. The pipeline fitting of claim 4, wherein the body further includes:
   a second end portion on an opposite end from the first end portion, the second end portion including a second nose section,
   wherein the second end form further includes at least one gripping member and an additional gripping member and first and second steps.

6. A pipeline fitting connectable to an end portion of a first tube, the pipeline fitting comprising:
   a body having a first tubular nose section and a first end form formed on a first end portion of the pipeline fitting;
   at least one gripping member having a ramped wall extending axially over the body to a first height over the body from the first nose section, the gripping member ramped wall forming a gripping surface having a lengthened radial gripping surface portion located between first and second shortened radial gripping surface portions that are positioned perpendicularly on the body in the axial direction of the gripping member ramped wall and that terminate at a multi-radial first step extending perpendicularly from the body that join the lengthened radial gripping surface portion and the first and second shortened radial gripping surface portions to the body; and
   at least one additional gripping member having a ramped wall that extends from the body at a location spaced axially from the first step and that extends axially over the body to the first height the additional gripping member ramped wall forming a gripping surface,
   wherein the gripping member is configured to be received within the end portion of the first tube when the gripping member is received within the end portion of the first tube to frictionally engage an inner surface of the end portion of the first tube to the gripping member and the additional gripping member is received at least partly within the end portion of the first tube to frictionally engage an inner surface of the end portion of the tube to the additional gripping member.

7. The pipeline fitting of claim 6, wherein
   the end portion of the first tube frictionally engages the first step when the gripping member is received at least partly within the end portion of the first tube.

8. The pipeline fitting of claim 6, wherein the additional gripping member ramped wall terminates in a lengthened radial gripping surface portion located between first and second shortened radial gripping surface portions that are positioned perpendicularly on the body to the axial direction of the additional gripping member ramped wall.

9. The pipeline fitting of claim 8, wherein the additional gripping member further includes a multi-radial second step located perpendicularly on the body to the axial direction of the additional gripping member ramped wall and the additional gripping member lengthened radial gripping surface portion and first and second shortened radial gripping surfaces portions terminate at the second step, whereby the second step joins the additional gripping member ramped wall to the body; and wherein the end portion of the first tube frictionally engages the second step when the additional gripping member is received at least partly within the end portion of the first tube.

10. The pipeline fitting of claim 8, wherein the first end form includes a plurality of gripping members and first and second steps located about the first end form.

11. The pipeline fitting of claim 10, wherein the first tube abuts against a first flange when the end portion of the first tube is partly received over the first end form.

12. The pipeline fitting of claim 10, wherein the pipeline fitting is connectable to a second tube and the body further includes a second end portion on an opposite end from the first end portion, the second end portion having a second nose section, the second end portion including a plurality of gripping members and first and second steps located about the second end form; and the plurality of gripping members and first and second steps are configured to be received at least partly within the end portion of the second tube when the second end form plurality of gripping members and first and second steps are received at least partly within the end portion of the second tube to frictionally engage an inner surface of the end portion of the second tube to the second end form plurality of gripping members and first and second steps.

13. The pipeline fitting of claim 12, wherein the second tube abuts against a second flange when the end portion of the second tube is partly received over the second end form.

14. A pipeline fitting for coupling a plurality of tubes, the pipeline fitting comprising:
a body having an internal passage and a first end portion and at least one other end portion located on the body;
an end form formed on the first end portion between a tubular nose section having an opening to the internal passage;
at least one other end form formed on the at least one other end portion between another nose section having an opening to the internal passage;
a first gripping member formed on the end form having a ramped wall extending axially over the body to a first height over the body from the nose section, the gripping member ramped wall forming a gripping surface having a lengthened radial gripping surface portion located between first and second shortened radial gripping surface portions that are positioned perpendicularly on the body to the axial direction of the gripping member ramped wall and that terminate in a multi-radial first step extending perpendicularly from the body that join the first gripping member lengthened radial gripping surface portion and the first and second shortened radial gripping surface portions to the body;
at least one first additional gripping member having a ramped wall that extends from the body at a location spaced axially from the first step and that extends axially over the body to the first height on the first end portion of the body the additional gripping member ramped wall forming a gripping surface;
a second gripping member formed on the other end form having a ramped wall extending axially over the body to a first height over the body from the other end form nose section, the second gripping member ramped wall forming a gripping surface having a lengthened radial gripping surface portion located between first and second shortened radial gripping surface portions that are positioned perpendicularly on the body to the axial direction of the other gripping member ramped wall and that terminate in a multi-radial first step extending perpendicularly from the body that join the second gripping member lengthened radial gripping surface portion and the first and second shortened radial gripping surface portions to the body;
at least one second additional gripping member having a ramped wall that extends from the body at a location spaced axially from the first step and that extends axially over the body to the first height on the other end portion of the body the second additional gripping member ramped wall forming a gripping surface;
the first gripping member and the at least one first additional gripping member are configured to be received at least partly within an end portion of at least one of the plurality of tubes when the nose section and the first gripping member and the at least one first additional gripping member are received at least partly within the end portion of the one tube to frictionally engage an inner surface of the end portion of the one tube to the first gripping member and the at least one first additional gripping member and couple the nose section and the interior passage to the one tube; and
the second gripping member and the at least one second additional gripping member are configured to be received at least partly within an end portion of another tube of the plurality of tubes when the other nose section and the second gripping member and the at least one second additional gripping member are received at least partly within the end portion of the another tube to frictionally engage an inner surface of the end portion of the another tube to the second gripping member and the at least one second additional gripping member and the other nose section and couple the other nose section and the interior passage to the another tube.

15. The pipeline fitting of claim 14, wherein
the end portion of the at least one tube frictionally engages the first step when the first gripping member is received at least partly within the end portion of the one tube.

16. The pipeline fitting of claim 14, wherein
the end portion of the another tube frictionally engages the second step when the second gripping member is received at least partly within the end portion of the another tube.

17. The pipeline fitting of claim 14, wherein the first additional gripping member ramped wall and the second additional gripping member ramped wall terminate in a lengthened radial gripping surface portion located between first and second shortened radial gripping surface portions that are positioned perpendicularly on the body to the axial direction of the additional gripping member ramped wall.

18. The pipeline fitting of claim 17, wherein the first additional gripping member further includes a multi-radial second step located perpendicularly on the body to the axial direction of the first additional gripping member ramped wall and the first additional gripping member lengthened radial gripping surface portion and first and second shortened radial gripping surfaces portions terminate at the second step, whereby the second step joins the first additional gripping member ramped wall to the body; and wherein the end portion of the one tube frictionally engages the second step when the first additional gripping member is received at least partly within the end portion of the one tube.

19. The pipeline fitting of claim 17, wherein the second additional gripping member further includes a multi-radial second step located perpendicularly on the body to the axial direction of the second additional gripping member ramped wall and the second additional gripping member lengthened radial gripping surface portion and first and second shortened radial gripping surfaces portions terminate at the second step, whereby the second step joins the second additional gripping member ramped wall to the body; and wherein the end portion of the another tube frictionally engages the second step when the second additional gripping member is received at least partly within the end portion of the another tube.

* * * * *